(12) United States Patent
Häderli et al.

(10) Patent No.: US 8,564,990 B2
(45) Date of Patent: Oct. 22, 2013

(54) CONVERTER DEVICE AND METHOD FOR CONTROLLING A CONVERTER DEVICE

(75) Inventors: Christoph Häderli, Zürich (CH);
Toufann Chaudhuri, Morges (CH)

(73) Assignee: ABB Research Ltd, Zürich (CH)

( * ) Notice: Subject to any disclaimer, the term of this patent is extended or adjusted under 35 U.S.C. 154(b) by 0 days.

(21) Appl. No.: 13/161,895

(22) Filed: Jun. 16, 2011

(65) Prior Publication Data
US 2011/0298278 A1 Dec. 8, 2011

Related U.S. Application Data

(63) Continuation of application No. PCT/EP2009/065749, filed on Nov. 24, 2009.

(30) Foreign Application Priority Data

Dec. 18, 2008 (EP) ..................................... 08172209

(51) Int. Cl.
*H02J 1/10* (2006.01)

(52) U.S. Cl.
USPC ............... 363/65; 363/59; 363/109; 323/282; 323/299; 307/63; 307/81

(58) Field of Classification Search
USPC .......... 323/282, 299; 363/65, 109; 307/63, 81
See application file for complete search history.

(56) References Cited

U.S. PATENT DOCUMENTS

| 5,644,483 A | 7/1997 | Peng et al. |
| 6,005,788 A * | 12/1999 | Lipo et al. ........................ 363/71 |
| 6,023,109 A * | 2/2000 | Yang ................................ 307/81 |
| 6,104,624 A | 8/2000 | Iwamoto et al. |
| 6,459,596 B1 | 10/2002 | Corzine |

(Continued)

FOREIGN PATENT DOCUMENTS

| JP | 3180435 A | 11/1993 |
| WO | WO 2008/136977 A1 | 11/2008 |

OTHER PUBLICATIONS

Calais et al., "Multilevel Converters for Single-Phase Grid Connected Photovoltaic Systems—An Overview" Industrial Electronics, 1998. ISIE '98. IEEE International Symposium on Pretoria, South Africa Jul. 7-10, 1998, New York, NY, USA. IEEE, US, vol. 1, pp. 224-229.

(Continued)

*Primary Examiner* — Adolf Berhane
*Assistant Examiner* — Yemane Mehari
(74) *Attorney, Agent, or Firm* — Buchanan Ingersoll & Rooney PC (57) ABSTRACT

A converter apparatus and method for operating the converter apparatus are provided for producing a plurality of output voltages or a plurality of output voltage potentials at corresponding outputs. The converter apparatus includes a plurality of setting units, which are each associated with one of a plurality of input voltage sources, Each of the setting units is configured to vary an input voltage which is produced by the associated input voltage source, and to provide an intermediate voltage. The converter apparatus also includes a plurality of selection elements to which intermediate voltage potentials are each applied. The intermediate voltage potentials are defined by the intermediate voltages. Each selection element is configured to select one of the intermediate voltage potentials for outputting as the respective output voltage potential.

21 Claims, 3 Drawing Sheets

(56) References Cited

U.S. PATENT DOCUMENTS

| | | | |
|---|---|---|---|
| 2005/0213356 A1* | 9/2005 | Yanagida et al. | ............... 363/59 |
| 2008/0150366 A1 | 6/2008 | Adest et al. | |
| 2008/0278968 A1 | 11/2008 | Srinivasan et al. | |

OTHER PUBLICATIONS

International Preliminary Examination Report (Rule 71.1 PCT, Form PCT/IPEA/416) and the International Preliminary Report on Patentability (Form PCT/IPEA/409) dated Jul. 4, 2011, issued in the corresponding International Application No. PCT/EP2009/065749, and an English Translation of the International Preliminary Report on Patentability thereof.

International Search Report (PCT/ISA/210) issued on Jun. 21, 2010, by European Patent Office as the International Searching Authority for International Application No. PCT/EP2009/065749.

Search Report issued on Jul. 8, 2009, by European Patent Office for Application No. 08172209.2.

First Office Action dated Apr. 22, 2013 in corresponding Chinese Application No. 200980151891.8, and English-language translation, 10 pps.

* cited by examiner

CONVERTER DEVICE AND METHOD FOR CONTROLLING A CONVERTER DEVICE

RELATED APPLICATION

This application claims priority as a continuation application under 35 U.S.C. §120 to PCT/EP 2009/065749, which was filed as an International Application on Nov. 24, 2009 designating the U.S., and which claims priority to European Application 08172209.2 filed in Europe on Dec. 18, 2008. The entire contents of these applications are hereby incorporated by reference in their entireties.

FIELD

The present disclosure relates to converter device and a method for controlling a converter device. More particularly, the present disclosure relates to a voltage converter, such as an inverter, which generate AC voltages from a plurality of DC voltage sources, a method for controlling such a voltage converter.

BACKGROUND INFORMATION

A wide range of forms of voltage converters, such as inverters for producing one or more AC or phase voltages, are known. Examples of inverter topologies are ANPC (active neutral point clamped), NPC (neutral point clamped) or MPC, cascaded H-bridges and the like, which each have specific characteristics. In many topologies of inverters, a switching unit exists in which high voltages are switched in the range of the voltage shift to be provided in the output voltage, at a high frequency, in order to produce the desired voltage waveforms at the outputs of the inverter. This requires corresponding design of the power components used, as a result of which the conventional topologies of inverters are complex to implement.

Furthermore, some of the conventional inverters have intermediate circuit capacitors in order to produce intermediate point voltages, by means of which a plurality of voltage levels can be produced for operation of the inverter. These capacitors are in general susceptible to ageing, thus limiting the life of such inverters.

U.S. Pat. No. 6,104,624 discloses a conventional converter apparatus which has two selection elements. Only a single intermediate voltage potential is applied to each of these two selection elements, and each selection element can then select only this one intermediate voltage potential for outputting as the respective output voltage potential.

SUMMARY

An exemplary embodiment of the present disclosure provides a converter apparatus for producing a plurality of output voltages or a plurality of output voltage potentials at corresponding outputs. The exemplary converter apparatus includes a plurality of setting units, which are each associated with one of a plurality of input voltage sources. Each of the setting units is configured to vary a respective input voltage which is produced by the associated input voltage source, and to provide an intermediate voltage, respectively. The exemplary converter apparatus also includes a plurality of selection elements each being configured to have intermediate voltage potentials applied thereto. The intermediate voltage potentials are defined by the intermediate voltages. Each selection element is configured to select one of the intermediate voltage potentials for outputting as the respective output voltage potential, respectively. The voltage outputs of the setting units are connected to one another in series such that the intermediate voltages are added, and the respective intermediate voltage potential is produced at some or each of the voltage outputs, for selection by a respective one of the selection elements. The exemplary converter apparatus also includes a control unit configured to control the plurality of setting units such that the setting units produce intermediate voltage potentials which contain the output voltage potentials to be produced, to select in each case one of the intermediate voltage potentials, and to produce the one of the intermediate voltage potentials at a corresponding output, respectively.

An exemplary embodiment of the present disclosure provides a method for operation of a converter apparatus for producing a plurality of output voltages or a plurality of output voltage potentials at corresponding outputs. The converter apparatus includes a plurality of setting units, which are each associated with one of a plurality of input voltage sources. Each of the setting units is configured to vary a respective input voltage which is produced by the associated input voltage source, and to provide an intermediate voltage, respectively. The converter apparatus also includes a plurality of selection elements each being configured to have intermediate voltage potentials applied thereto, where the intermediate voltage potentials are defined by the intermediate voltages. Each selection element is configured to select one of the intermediate voltage potentials for outputting as the respective output voltage potential, respectively. The converter apparatus also includes a control unit configured to control the plurality of setting units such that the setting units produce intermediate voltage potentials which contain the output voltage potentials to be produced, respectively. The exemplary method includes controlling the plurality of setting units such that the setting units produce the intermediate voltage potentials which contain the output voltage potentials to be produced. The exemplary method also includes controlling the selection elements such that in each case one of the intermediate voltage potentials is selected, and is produced at a corresponding output, respectively.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Exemplary embodiments of the present disclosure provide an inverter which can be operated with a plurality of individual voltage sources, and a method for operating such an inverter.

An exemplary embodiment of the present disclosure provides a converter apparatus for producing a plurality of output voltages or a plurality of output voltage potentials at corresponding outputs. The exemplary converter apparatus includes a plurality of setting units, which are each associated with one of a plurality of input voltage sources, respectively. Each of the setting units are configured to vary an input voltage which is produced by the associated input voltage source, and to provide an intermediate voltage. The exemplary converter apparatus also includes a plurality of selection elements which are each configured to have intermediate voltage potentials applied thereto. The intermediate voltage potentials are defined by the intermediate voltages. Each selection element is configured to select one of the intermediate voltage potentials for outputting as the respective output voltage potential.

In accordance with an exemplary embodiment of the above-described converter apparatus, the setting units are associated with a plurality of input voltage sources, in order to produce the variable intermediate voltages. An appropriate intermediate voltage potential, which is produced by the setting units, is selected with the aid of selection elements for each output voltage potential to be produced, and the input voltage potential is produced as the output voltage potential to be produced. In a converter apparatus such as this, the voltage waveforms at each of the outputs can thus be formed by being composed in sections from the waveforms of the intermediate voltage potentials produced by the setting units. The selection elements in this case have the function of passing on an intermediate voltage potential, which is produced by one of the setting units, to one of the outputs. The actual function of producing the desired intermediate voltage potential is carried out for each input voltage source. Because of the lower voltages there, the requirements for the power and the design of the components used there are less stringent.

Furthermore, voltage outputs of the setting units can be connected in series with one another such that the intermediate voltages are added, and the respective intermediate voltage potential is produced at some or each of the voltage outputs, for selection by a respective one of the selection elements.

An exemplary embodiment of the present disclosure provides a converter arrangement which includes the above converter apparatus and a control unit. The control unit is configured to control the plurality of setting units such that the setting units produce intermediate voltage potentials which include the output voltage potentials to be produced. The control unit is also configured to select in each case one of the intermediate voltage potentials and to produce it at a corresponding output.

In accordance with an exemplary embodiment, the control unit is configured to control the selection elements such that the lowest intermediate voltage potential produced by the setting units is selected to produce the lowest output voltage potential, and the highest intermediate voltage potential produced by the setting units is selected to produce the highest output voltage potential.

In accordance with an exemplary embodiment, the control unit is configured to control the setting units such that, when intermediate voltages are connected in series, the added intermediate voltages result in a voltage which corresponds to the voltage between the highest output voltage potential to be produced and the lowest output voltage potential to be produced.

For instance, the control unit can be configured to control the setting units such that a mean of the output voltage potentials is produced by selection of one of the mean intermediate voltage potentials.

In accordance with an exemplary embodiment, the control unit is configured to control the setting units such that the mean intermediate voltage potential is generated at a selected voltage output of one of the setting units.

In accordance with an exemplary embodiment, the control unit is configured to select the voltage output of one of the setting units as a function of a desired load distribution between the input voltage sources which are associated with the setting units, for example, with the ratio of the intermediate voltages of the individual setting units corresponding to the load distribution between the corresponding setting units.

In accordance with an exemplary embodiment, the control unit is configured to select the voltage output of one of the setting units by dividing the voltage difference between the highest and the lowest output voltage potential by the number of available setting units. The voltage output of that setting unit which is closer to the output voltage potential to be produced is selected to produce one of the mean output voltage potentials.

For instance, the control unit can be configured to control the setting units such that the mean intermediate voltage potential is generated where a first group of one or more setting units, which is/are arranged between the selected voltage output and the voltage output of the highest intermediate voltage potential, each produce an intermediate voltage which correspond to the voltage difference between the output voltage potential to be produced and the highest output voltage potential to be produced divided by the number of setting units in the first group, and a second group of setting units, which are arranged between the selected voltage output and the voltage output of the lowest intermediate voltage potential, each produce an intermediate voltage which corresponds to the voltage difference between the output voltage potential to be produced and the lowest output voltage potential to be produced, divided by the number of setting units in the second group.

In accordance with an exemplary embodiment, the control unit is configured to vary the intermediate voltages of the setting units cyclically or continuously in order to produce the output voltages, such that the intermediate voltages are produced continuously or in successive time windows.

An exemplary embodiment of the present disclosure provides a method for operation of the above-described converter apparatus. The method includes controlling the plurality of setting units such that the setting units produce intermediate voltage potentials which contain the output voltage potentials to be produced. The exemplary method also includes controlling the selection elements such that in each case one of the intermediate voltage potentials is selected, and is produced at a corresponding output.

Figure 1:
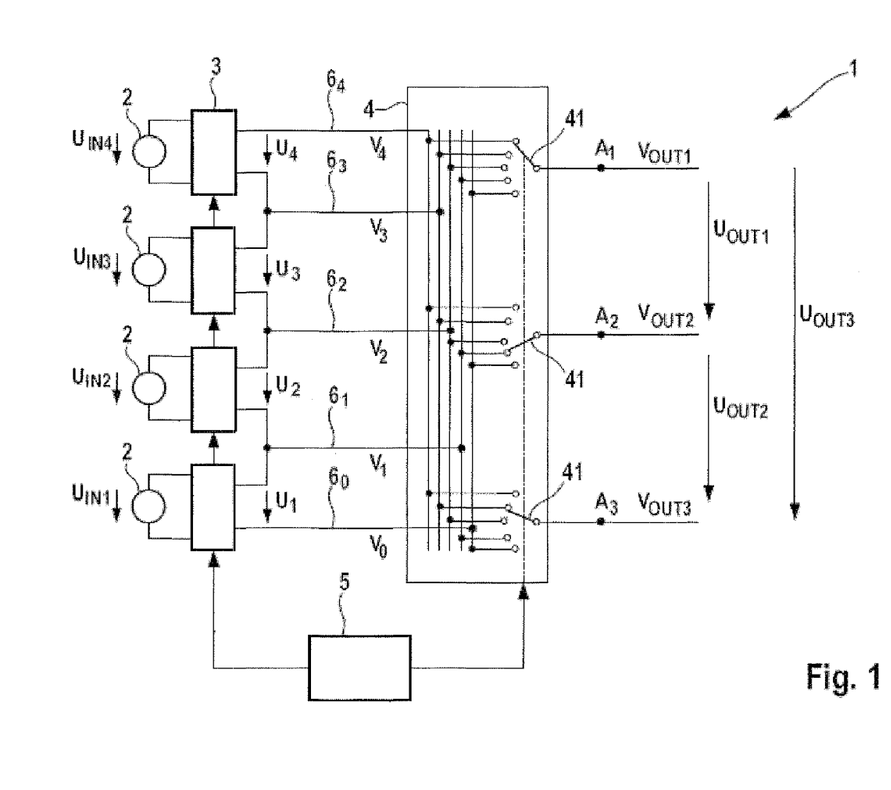
FIG. 1 shows a schematic illustration of an exemplary embodiment of an inverter with four DC voltage sources and three outputs, at which output voltage potentials are produced.

FIG. 1 shows a schematic illustration of a multi-level three-phase inverter 1 as an example of a converter apparatus according to the present disclosure.

The inverter 1 is supplied by a number of input voltage sources 2. By way of example, the input voltage sources 2 may have DC voltage sources in the form of solar cells, fuel cells, generators, batteries and the like. In the illustrated exemplary embodiment, four input voltage sources 2 are used. However, it is also possible to use any other desired number of input voltage sources. The input voltage sources 2 each produce one input voltage $U_{IN1}$ to $U_{IN4}$.

The input voltage sources 2 may each include a plurality of individual voltage sources, which are connected in series and/or in parallel. For example, the input voltage sources 2 may include a plurality of series circuits connected in parallel, with a plurality of individual voltage sources. The series circuits may be connected to one another by suitable inductances, for decoupling. For example, the inductances may be in the form of separate components, or else in the form of a pure stray inductance, that is to say resulting from lines of appropriate length.

Each of the input voltage sources 2 is connected to an associated setting unit 3, which generates a corresponding variable intermediate voltage $U_1$ to $U_4$ from the respectively produced input voltage $U_{IN1}$ to $U_{IN4}$. In accordance with this exemplary embodiment, the setting unit 3 can generate an intermediate voltage in the range between 0 and $U_{INn}$ (n=1 ... 4), as demanded by a control unit 5, from the input voltage $U_{IN1}$ to $U_{IN4}$ that is produced.

Figure 2:
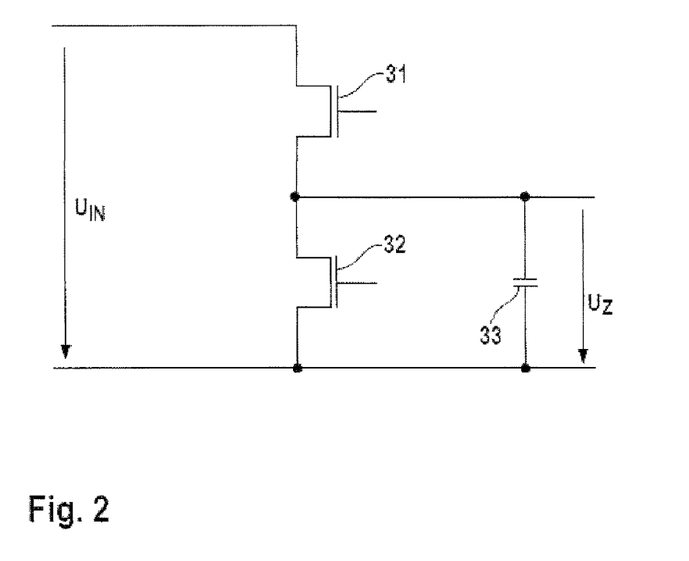
FIG. 2 shows a schematic illustration of an exemplary embodiment of a setting unit for the inverter shown in FIG. 1.

FIG. 2 shows an exemplary embodiment of a setting unit 3 that can be provided in the inverter shown in FIG. 1. FIG. 2 shows an inverter circuit with a first power switch as a pull-high transistor 31 and a second power switch as a pull-low transistor 32, which can be controlled separately. An appropriate voltage can be generated as the intermediate voltage $U_z(U_1-U_4)$ from the applied input voltage $U_{IN}$ by switching the transistors 31, 32 on and off alternately with the aid of pulse-width modulation. A capacitor 33 can be provided in order to smooth the intermediate voltage $U_z$ that is produced.

In the illustrated exemplary embodiment of the inverter, the intermediate voltages $U_1$ to $U_4$ produced by the setting units 3 are connected in series. Connecting the intermediate voltages $U_1$ to $U_4$ in series results in a voltage divider with the intermediate potentials $V_0$ to $V_4$, which are produced via corresponding intermediate point lines $6_0$-$6_4$ of a selection unit 4.

The selection unit 4 produces the output voltages $U_{out1}$, $U_{out2}$, $U_{out3}$ and the output voltage potentials $V_{out1}$, $V_{out2}$, $V_{out3}$ at the respective $A_1$, $A_2$, $A_3$ outputs of the inverter 1. The selection unit 4 has a separate selection element 41 for each output of the inverter 1. In the illustrated exemplary embodiment, the selection element 41 is connected on the input side to the intermediate potentials $V_0$ to $V_4$, selects one of the intermediate potentials $V_0$ to $V_4$ as a function of a control signal which is produced by the control unit 5 for each selection element 41, and outputs this at the appropriate output $A_1$, $A_2$, $A_3$ as the output voltage potential $V_{out1}$, $V_{out2}$, $V_{out3}$ or as the output voltage $U_{out1}$, $U_{out2}$, $U_{out3}$, respectively. In the illustrated exemplary embodiment, the inverter 1 has three outputs, each of which has an associated selection element 41, in order to produce the output voltages $U_{out1}$, $U_{out2}$, $U_{out3}$ and the output voltage potentials $V_{out1}$, $V_{out2}$, $V_{out3}$, respectively.

A method of operation of the illustrated inverter 1 is based on controlling the setting units 3 in order to produce the intermediate voltages $U_1$ to $U_4$ such that the intermediate potentials $V_0$ to $V_4$ and the intermediate voltages $U_1$ to $U_4$ always produce the desired predetermined output voltage potentials $V_{out1}$, $V_{out2}$, $V_{out3}$ and the desired predetermined output voltages $U_{out1}$, $U_{out2}$, $U_{out3}$. That is to say, at least one of the intermediate potentials $V_0$ to $V_4$ corresponds to a corresponding output voltage potential $V_{out1}$, $V_{out2}$, $V_{out3}$ to be produced, and at least one of the intermediate voltages $U_1$ to $U_4$ corresponds to a corresponding output voltage $U_{out1}$, $U_{out2}$, $U_{out3}$ to be produced. This allows the selection elements 41 to select the appropriate output voltage potential $V_{out1}$, $V_{out2}$, $V_{out3}$ and the appropriate output voltages $U_{out1}$, $U_{out2}$, $U_{out3}$ for application to the respectively associated outputs of the inverter 1.

In accordance with an exemplary embodiment, the intermediate voltages are selected by the selection elements 41 and the setting units 3 are set cyclically or periodically, thus resulting, over time, in the desired waveforms of the output voltages $U_{out1}$, $U_{out2}$, $U_{out3}$ and the output voltage potentials $V_{out1}$, $V_{out2}$, $V_{out3}$.

The control of the setting units 3 by the control unit 5 leads to the setting units 3 each producing a specific voltage waveform section-by-section—controlled by the control unit 5, such that the selection elements 41 are each connected for a specific time period to one of the intermediate voltage lines $6_0$-$6_4$, before being switched to a further intermediate voltage line $6_0$-$6_4$.

In accordance with an exemplary embodiment, the control unit 5 controls the setting units 3 and the selection elements 41 of the selection unit 4 such that a specific predefined output voltage waveform of the output voltages $U_{OUT1}$ to $U_{OUT3}$ and potential waveform of the output voltage potentials $V_{out1}$, $V_{out2}$, $V_{out3}$ is generated.

According to an exemplary embodiment of a method for generation of the output voltages $U_{OUT1}$ to $U_{OUT3}$, the intermediate voltages $U_1$ to $U_4$ to be set by the setting units 3 are determined at each time (cycle). By way of example, the following method can be used for this purpose:

First of all, the requirement for the desired output voltage potentials $V_{out1}$, $V_{out2}$, $V_{out3}$ is used to determine the lowest output potential as $V_{LOW}$, the medium output potential as $V_{MID}$ and the highest output potential as $V_{HIGH}$. The lowest output potential $V_{LOW}$ is then produced by the intermediate potential line $6_0$, and the highest output potential $V_{HIGH}$ is produced by the intermediate potential line $6_4$ (assuming that the intermediate voltages $U_Z$ of the setting units 3 are positive). The appropriate switching elements 41 therefore connect that output with the intermediate potential line $6_0$ at which the lowest output potential $V_{LOW}$ is intended to be output, and that output with the intermediate potential line $6_4$ at which the highest output potential $V_{HIGH}$ is intended to be output. The medium output potential $V_{MID}$ can now be produced by one of the intermediate potential lines $6_1$, $6_2$ and $6_3$.

In order to distribute the power to be drawn from the input voltage sources 2 as equally as possible, an exemplary embodiment of the present disclosure provides for the selection of that intermediate potential line which is determined in accordance with the following rule to be selected from the intermediate potential lines which are between the intermediate potential line at the lowest potential and the intermediate potential line at the highest potential. The intermediate potential line $6_X$ is intended to generate the medium voltage value for the remaining output of the inverter 1, where $1 \leq x \leq N-1$, where N is the number of input voltage sources, and in the present case this corresponds to N=4. In this case:

$$X = \mathrm{Floor}(1 + r(N-1)),$$

where $r = (V_{MID} - V_{LOW})(V_{HIGH} - V_{LOW})$. $U_1 \ldots U_X = (V_{MID} - V_{LOW})X$ and $U_{x+1} \ldots U_{N-1} = (V_{HIGH} - U_{MID})/(N-X)$ are appropriately set as intermediate voltages. The intermediate potential line $6_X$ is selected, corresponding to the connection to the output $A_1$, $A_2$, $A_3$, by the selection element 41 which is associated with the output $A_1$, $A_2$, $A_3$ and at which the medium output potential is intended to be output.

In accordance with an exemplary embodiment, this method can be carried out cyclically on the basis of a setting frequency of the setting units 3, which describes the cycle of setting the respective intermediate voltage. The setting frequency is governed by the desired ripple and accuracy of the desired output voltages and output voltage potentials.

Figure 3:
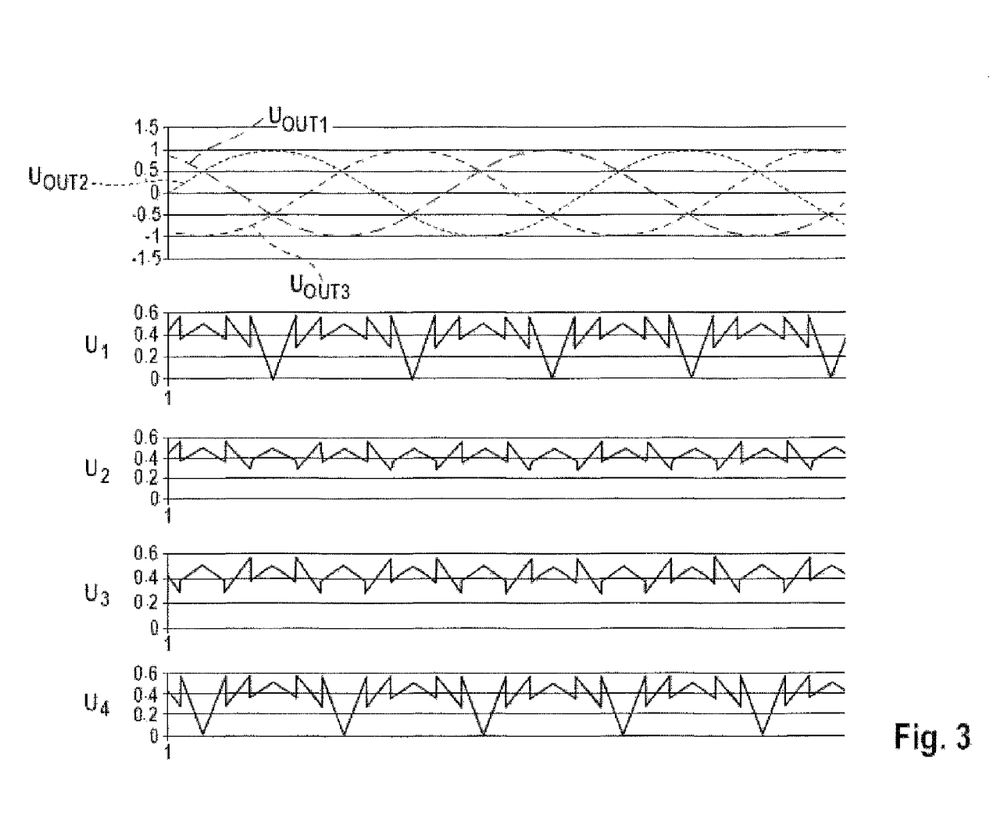
FIG. 3 shows the waveforms of three output voltages and the intermediate voltage potentials of the individual setting units as a contribution to generation of the respective phase voltage.

FIG. 3 illustrates an example of three output voltages $U_{out1}$, $U_{out2}$, $U_{out3}$, which are intended to be produced as three phase voltages, offset through 120°. The output voltages $U_{out1}$, $U_{out2}$, $U_{out3}$ are generated from waveforms of the individual intermediate voltages $U_1$ to $U_4$ which are produced by the individual setting units 3, as controlled by the control unit 5, using the above method.

When using the above method, the load is distributed as well as possible between the individual input voltage sources 2. Furthermore, the switching frequency of the selection elements 41 is low, since the selection elements 41 are in general switched only when it is necessary to change the association between the respective output $A_1$, $A_2$, $A_3$ and the associated highest, medium and lowest output potentials $V_{HIGH}$, $V_{MID}$, $V_{LOW}$.

The method described above corresponds to a specific strategy, which the control unit 5 can use to control the inverter 1, in order to achieve voltages which are as low as possible as intermediate voltages $U_1$-$U_4$. Since the same current flows through each of the setting units 3 because all the intermediate voltages $U_1$-$U_4$ are connected in series, the power of each of the input voltage sources 2 can therefore be kept as low as possible and, furthermore, the load can be distributed as uniformly as possible between the individual input voltage sources 2.

Furthermore, there is also no need to apply the intermediate potential line with the lowest intermediate potential and the potential line with the highest intermediate potential to outputs of the inverter. Other strategies can, for example, provide for intermediate voltages $U_1$ to $U_4$ which are as high as possible to be generated, for example, by the selection of intermediate potential lines $6_0$-$6_4$ which are as close to one another for the highest and the lowest output potential. Alternatively, it is possible to use very specific absolute values as intermediate voltages $U_1$ to $U_4$, for example, intermediate voltages which represent preferred operating points for the setting circuits 3 and the input voltage sources 2.

For example, individual input voltage sources 2 can be switched off by shorting the setting units (intermediate voltage 0 V) on the output side, when these sources are intended to be changed or serviced, or have failed because of a fault. This does not adversely affect the operability of the inverter 1, provided that the control unit 5 takes this into account in its control strategy, for example, by presetting the relevant intermediate voltage to be fixed at 0 V, and by carrying out the above method, omitting the relevant intermediate voltage. It is therefore possible to continue to operate the inverter 1 even if one or more of the input voltage sources has or have failed or been switched off, without having to take any special measures. All that is required for this purpose is to provide a feedback line from the individual input voltage sources 2 and from the input side of the setting units 3, which produces the instantaneous state of the input voltage source 2 and an indication of the instantaneous value of the input voltage $U_{IN1}$ to $U_{IN4}$ of the control unit 5.

However, since each of the setting units 3 is connected to one input voltage source 2, which represents only a small proportion of the maximum possible maximum output voltage, the requirements for the design of the setting units 3 are considerably less stringent than in the case of a conventional DC inverter.

The above method is suitable for loading the input voltage source to the same extent. Since all the intermediate voltages are connected in series, the same current flows through the input voltage sources 2. The proportion of the total power which each input voltage source 2 has to produce is therefore dependent only on the intermediate voltage that is produced, that is to say it is proportional to the intermediate voltage produced by the relevant setting unit. If a desired output voltage is produced by the interaction of a plurality of input voltage sources, as is the case in the method described above, then, until now, provision has been made for each of the relevant setting units 3 to output the same voltage, in order in this way to distribute the power produced by the input voltage sources 2 equally, and to achieve a uniform load distribution. However, the control unit 5 can also be used to monitor the power, and thus to split, for example, the proportion of the power to different extents between the various input voltage sources 2. This arrangement makes it possible to achieve a defined load distribution. For example, this arrangement makes it possible for a first of the setting units 3 to produce a higher intermediate voltage than a second of the setting units 3, even though these are equally provided for the production of an output voltage and of an output voltage potential. The ratio of the intermediate voltages produced by the first and the second setting units 3 corresponds to a predetermined ratio of the loads and of the power produced by the associated input voltage sources 2. This allows the power to be distributed differently at this operating point or at this time (cycle).

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

List of Reference Symbols

1 Inverter
2 Input voltage source
3 Setting unit
4 Selection unit
5 Control unit
6 Intermediate potential line
31 Pull-high transistor
32 Pull-low transistor
33 Capacitor
41 Selection element
$U_1$, $U_2$, $U_3$, $U_4$ Intermediate voltage
$V_0$, $V_1$, $V_2$, $V_3$, $V_4$ Intermediate voltage potential
$U_{IN1}$, $U_{IN2}$, $U_{IN3}$, $U_{IN4}$ Input voltage
$V_{OUT1}$, $V_{OUT2}$, $V_{OUT3}$ Output voltage potential
$A_1$, $A_2$, $A_3$ Output

What is claimed is:

1. A converter apparatus for producing a plurality of output voltages or a plurality of output voltage potentials at corresponding outputs, the converter apparatus comprising:
a plurality of setting units, which are each associated with one of a plurality of input voltage sources, each of the setting units being configured to vary a respective input voltage which is produced by the associated input voltage source, and to provide an intermediate voltage, respectively;
a plurality of selection elements each being configured to have intermediate voltage potentials applied thereto, the intermediate voltage potentials being defined by the intermediate voltages, each selection element being configured to select one of the intermediate voltage potentials for outputting as the respective output voltage potential, respectively, wherein the voltage outputs of the setting units are connected to one another in series such that the intermediate voltages are added, and the respective intermediate voltage potential is produced at some or each of the voltage outputs, for selection by a respective one of the selection elements; and
a control unit configured to control the plurality of setting units such that the setting units produce intermediate voltage potentials which contain the output voltage potentials to be produced, to select in each case one of the intermediate voltage potentials, and to produce the one of the intermediate voltage potentials at a corresponding output, respectively.

2. The converter arrangement as claimed in claim 1, wherein the control unit is configured to control the selection elements such that a lowest intermediate voltage potential produced by the setting units is selected to produce a lowest output voltage potential, and a highest intermediate voltage potential produced by the setting units is selected to produce a highest output voltage potential.

3. The converter arrangement as claimed in claim 1, wherein the control unit is configured to control the setting units, such that, when intermediate voltages are connected in series, the added intermediate voltages result in a voltage which corresponds to the voltage between a highest output voltage potential to be produced and a lowest output voltage potential to be produced.

4. The converter arrangement as claimed in claim 3, wherein the control unit is configured to control the setting units such that a mean of the output voltage potentials is produced by selection of one of the mean intermediate voltage potentials.

5. The converter arrangement as claimed in claim 4, wherein the control unit is configured to control the setting units such that the mean intermediate voltage potential is generated at a selected voltage output of one of the setting units.

6. The converter arrangement as claimed in claim 5, wherein the control unit is configured to select the voltage output of one of the setting units as a function of a desired load distribution of the input voltage sources which are associated with the setting units in which a ratio of the intermediate voltages of the individual setting units corresponds to the desired load distribution of the corresponding setting units.

7. The converter arrangement as claimed in claim 5, wherein the control unit is configured to select the voltage output of one of the setting units by dividing the voltage difference between the highest and the lowest output voltage potential by the number of available setting units, such that the voltage output of that setting unit which is closer to the output voltage potential to be produced is selected to produce one of the mean output voltage potentials.

8. The converter arrangement as claimed in claim 5, wherein the control unit is configured to control the setting units such that the mean intermediate voltage potential is generated in which:
    a first group of one or more setting units, which is/are arranged between the selected voltage output and the voltage output of the highest intermediate voltage potential, each produce an intermediate voltage which corresponds to the voltage difference between the output voltage potential to be produced and the highest output voltage potential to be produced divided by the number of setting units in the first group, respectively, and
    a second group of setting units, which are arranged between the selected voltage output and the voltage output of the lowest intermediate voltage potential, which each produce an intermediate voltage which corresponds to the voltage difference between the output voltage potential to be produced and the lowest output voltage potential to be produced, divided by the number of setting units in the second group, respectively.

9. The converter arrangement as claimed in claim 1, wherein the control unit is configured to vary the intermediate voltages of the setting units cyclically or continuously to produce the output voltages, such that the intermediate voltages are produced continuously or in successive time windows.

10. A method for operation of a converter apparatus for producing a plurality of output voltages or a plurality of output voltage potentials at corresponding outputs, wherein the converter apparatus includes:
    a plurality of setting units, which are each associated with one of a plurality of input voltage sources, each of the setting units being configured to vary a respective input voltage which is produced by the associated input voltage source, and to provide an intermediate voltage, respectively;
    a plurality of selection elements each being configured to have intermediate voltage potentials applied thereto, the intermediate voltage potentials being defined by the intermediate voltages, each selection element being configured to select one of the intermediate voltage potentials for outputting as the respective output voltage potential, respectively; and
    a control unit configured to control the plurality of setting units such that the setting units produce intermediate voltage potentials which contain the output voltage potentials to be produced, respectively, and
    wherein method comprises:
        controlling the plurality of setting units such that the setting units produce the intermediate voltage potentials which contain the output voltage potentials to be produced; and
        controlling the selection elements such that in each case one of the intermediate voltage potentials is selected, and is produced at a corresponding output, respectively.

11. The converter arrangement as claimed in claim 2, wherein the control unit is configured to control the setting units, such that, when intermediate voltages are connected in series, the added intermediate voltages result in a voltage which corresponds to the voltage between the highest output voltage potential to be produced and the lowest output voltage potential to be produced.

12. The converter arrangement as claimed in claim 11, wherein the control unit is configured to control the setting units such that a mean of the output voltage potentials is produced by selection of one of the mean intermediate voltage potentials.

13. The converter arrangement as claimed in claim 12, wherein the control unit is configured to control the setting units such that the mean intermediate voltage potential is generated at a selected voltage output of one of the setting units.

14. The converter arrangement as claimed in claim 13, wherein the control unit is configured to select the voltage output of one of the setting units as a function of a desired load distribution of the input voltage sources which are associated with the setting units in which a ratio of the intermediate voltages of the individual setting units corresponds to the desired load distribution of the corresponding setting units.

15. The converter arrangement as claimed in claim 13, wherein the control unit is configured to select the voltage output of one of the setting units by dividing the voltage difference between the highest and the lowest output voltage potential by the number of available setting units, such that the voltage output of that setting unit which is closer to the output voltage potential to be produced is selected to produce one of the mean output voltage potentials.

16. The converter arrangement as claimed in claim 15, wherein the control unit is configured to control the setting units such that the mean intermediate voltage potential is generated in which:
- a first group of one or more setting units, which is/are arranged between the selected voltage output and the voltage output of the highest intermediate voltage potential, each produce an intermediate voltage which corresponds to the voltage difference between the output voltage potential to be produced and the highest output voltage potential to be produced divided by the number of setting units in the first group, respectively, and
- a second group of setting units, which are arranged between the selected voltage output and the voltage output of the lowest intermediate voltage potential, which each produce an intermediate voltage which corresponds to the voltage difference between the output voltage potential to be produced and the lowest output voltage potential to be produced, divided by the number of setting units in the second group, respectively.

17. The converter arrangement as claimed in claim 6, wherein the control unit is configured to control the setting units such that the mean intermediate voltage potential is generated in which:
- a first group of one or more setting units, which is/are arranged between the selected voltage output and the voltage output of the highest intermediate voltage potential, each produce an intermediate voltage which corresponds to the voltage difference between the output voltage potential to be produced and the highest output voltage potential to be produced divided by the number of setting units in the first group, respectively, and
- a second group of setting units, which are arranged between the selected voltage output and the voltage output of the lowest intermediate voltage potential, which each produce an intermediate voltage which corresponds to the voltage difference between the output voltage potential to be produced and the lowest output voltage potential to be produced, divided by the number of setting units in the second group, respectively.

18. The converter arrangement as claimed in claim 7, wherein the control unit is configured to control the setting units such that the mean intermediate voltage potential is generated in which:
- a first group of one or more setting units, which is/are arranged between the selected voltage output and the voltage output of the highest intermediate voltage potential, each produce an intermediate voltage which corresponds to the voltage difference between the output voltage potential to be produced and the highest output voltage potential to be produced divided by the number of setting units in the first group, respectively, and
- a second group of setting units, which are arranged between the selected voltage output and the voltage output of the lowest intermediate voltage potential, which each produce an intermediate voltage which corresponds to the voltage difference between the output voltage potential to be produced and the lowest output voltage potential to be produced, divided by the number of setting units in the second group, respectively.

19. The converter arrangement as claimed in claim 5, wherein the control unit is configured to vary the intermediate voltages of the setting units cyclically or continuously to produce the output voltages, such that the intermediate voltages are produced continuously or in successive time windows.

20. The converter arrangement as claimed in claim 13, wherein the control unit is configured to vary the intermediate voltages of the setting units cyclically or continuously to produce the output voltages, such that the intermediate voltages are produced continuously or in successive time windows.

21. The converter arrangement as claimed in claim 16, wherein the control unit is configured to vary the intermediate voltages of the setting units cyclically or continuously to produce the output voltages, such that the intermediate voltages are produced continuously or in successive time windows.

* * * * *